Dec. 7, 1943.  N. R. KRAUSE  2,336,263
COMBINATION HARVESTER-THRESHER
Filed May 6, 1940  5 Sheets-Sheet 1
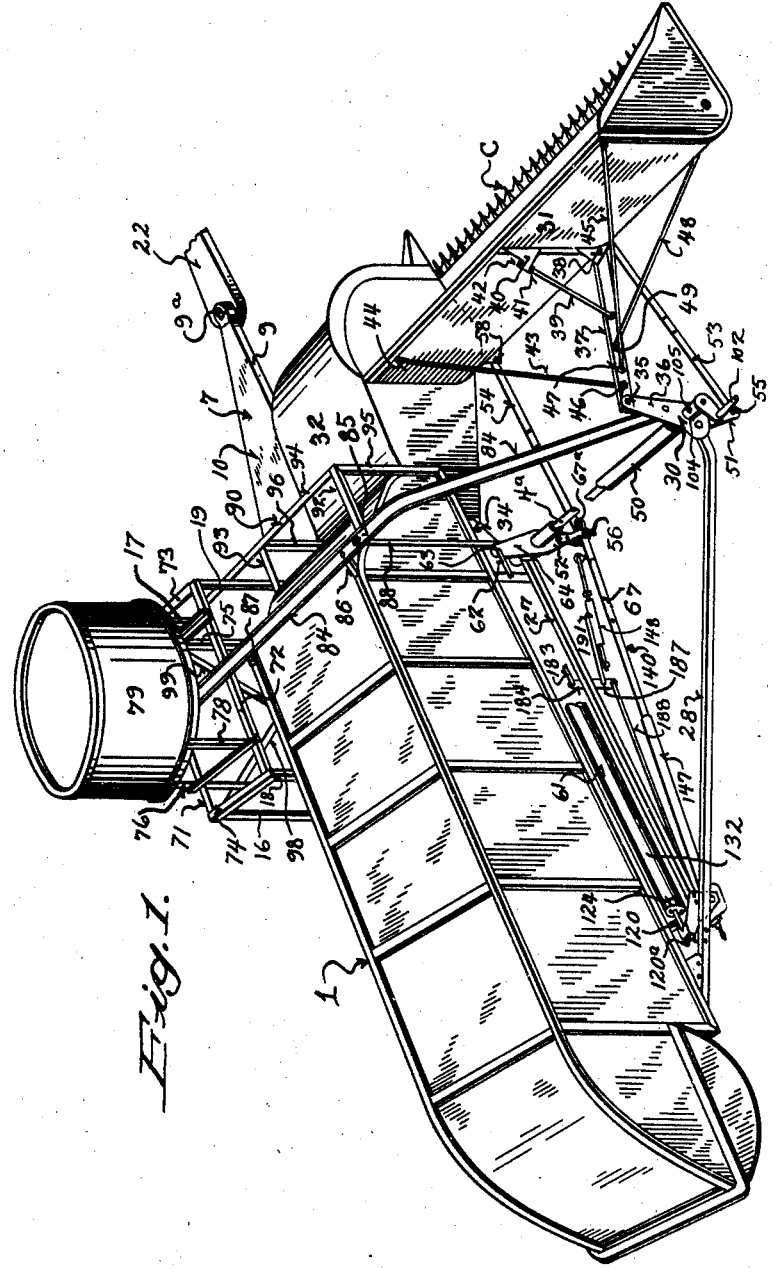
INVENTOR.
Norman R. Krause
BY Emerson B Donnell
ATTORNEY

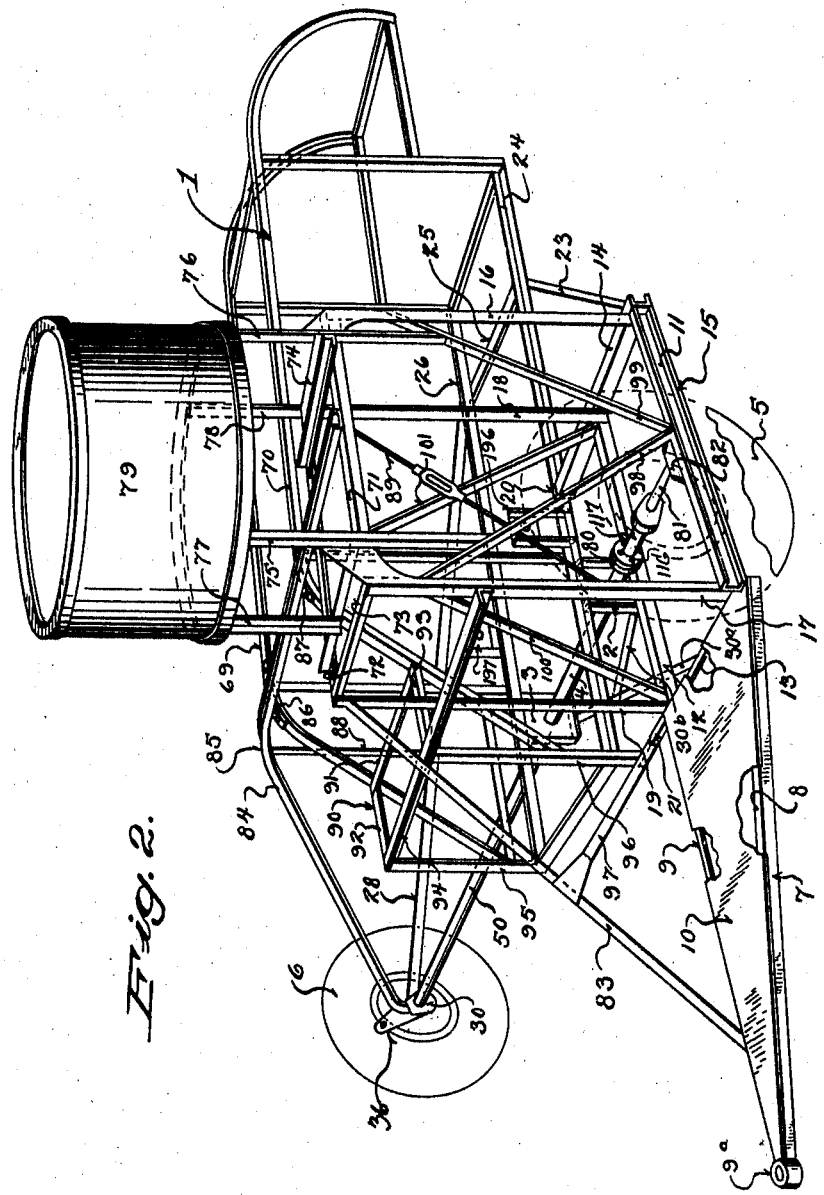

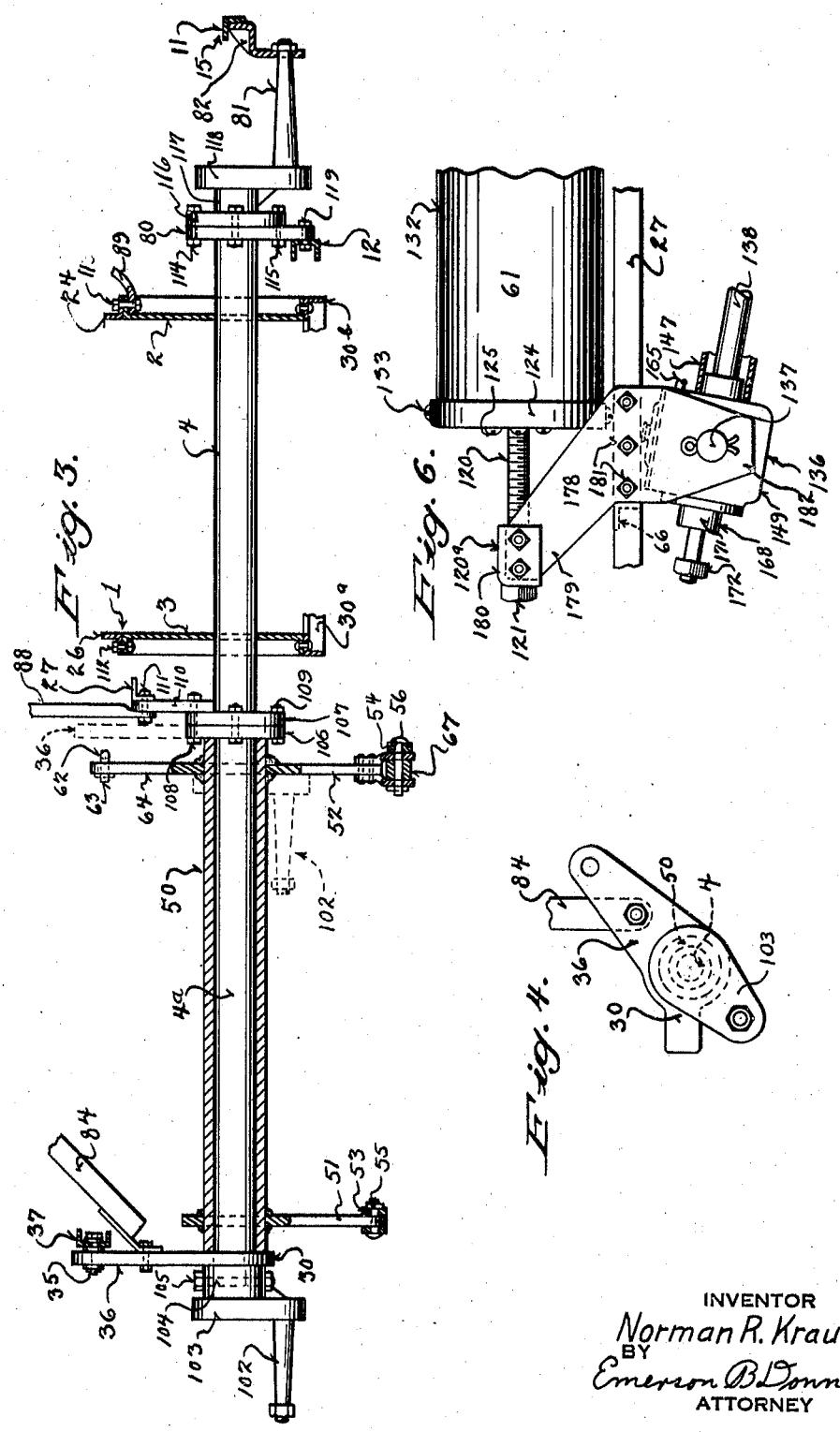

Dec. 7, 1943.   N. R. KRAUSE   2,336,263
COMBINATION HARVESTER-THRESHER
Filed May 6, 1940   5 Sheets-Sheet 4
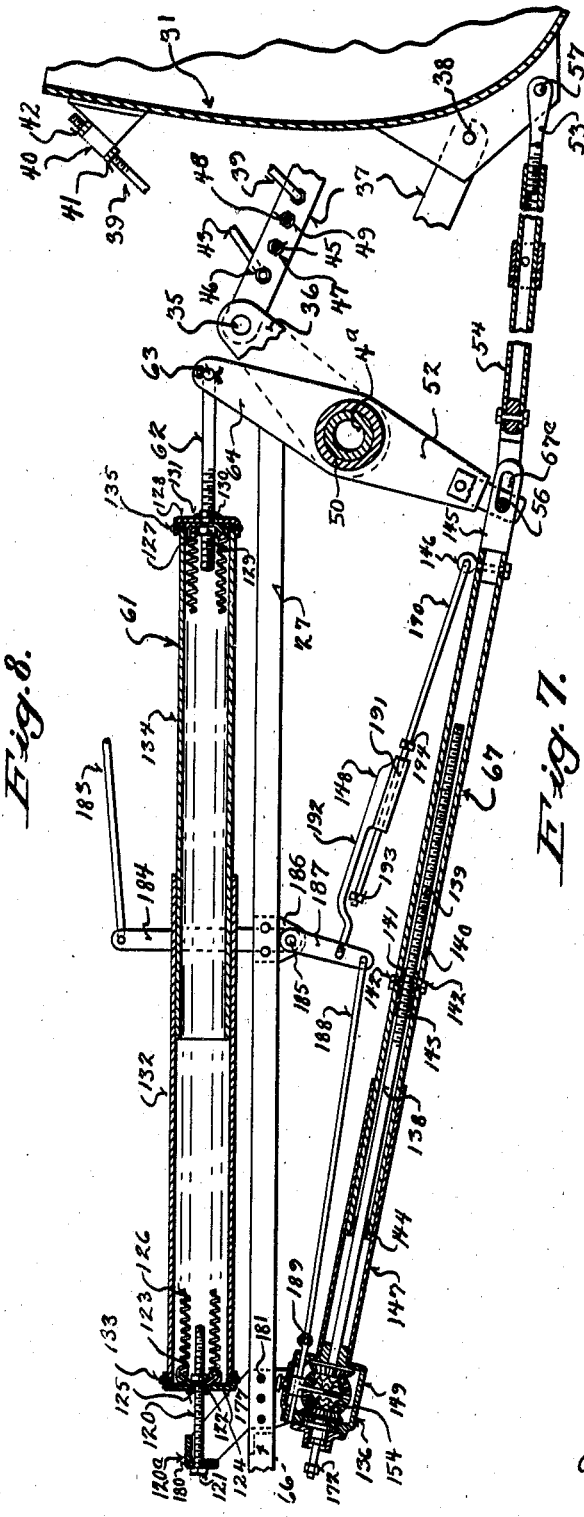
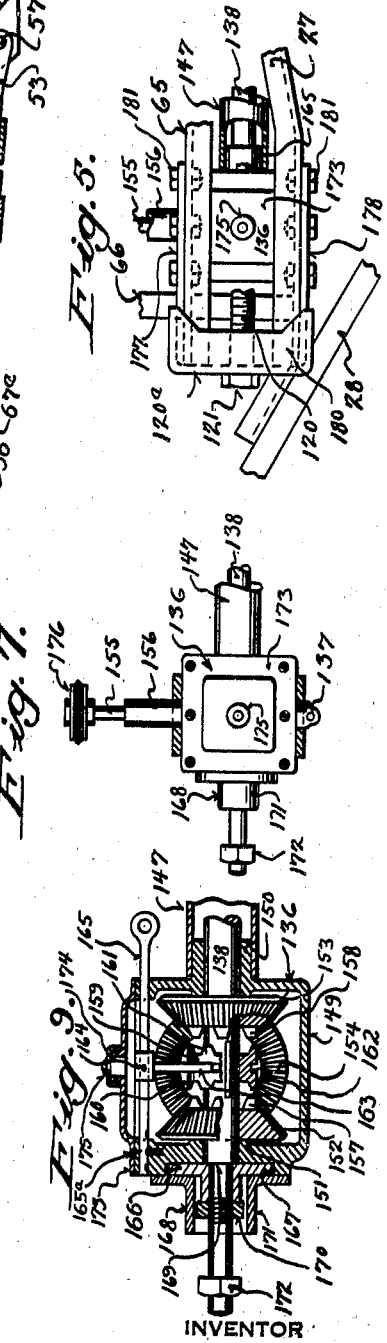
INVENTOR
Norman R. Krause
BY
Emerson B. Donnell
ATTORNEY

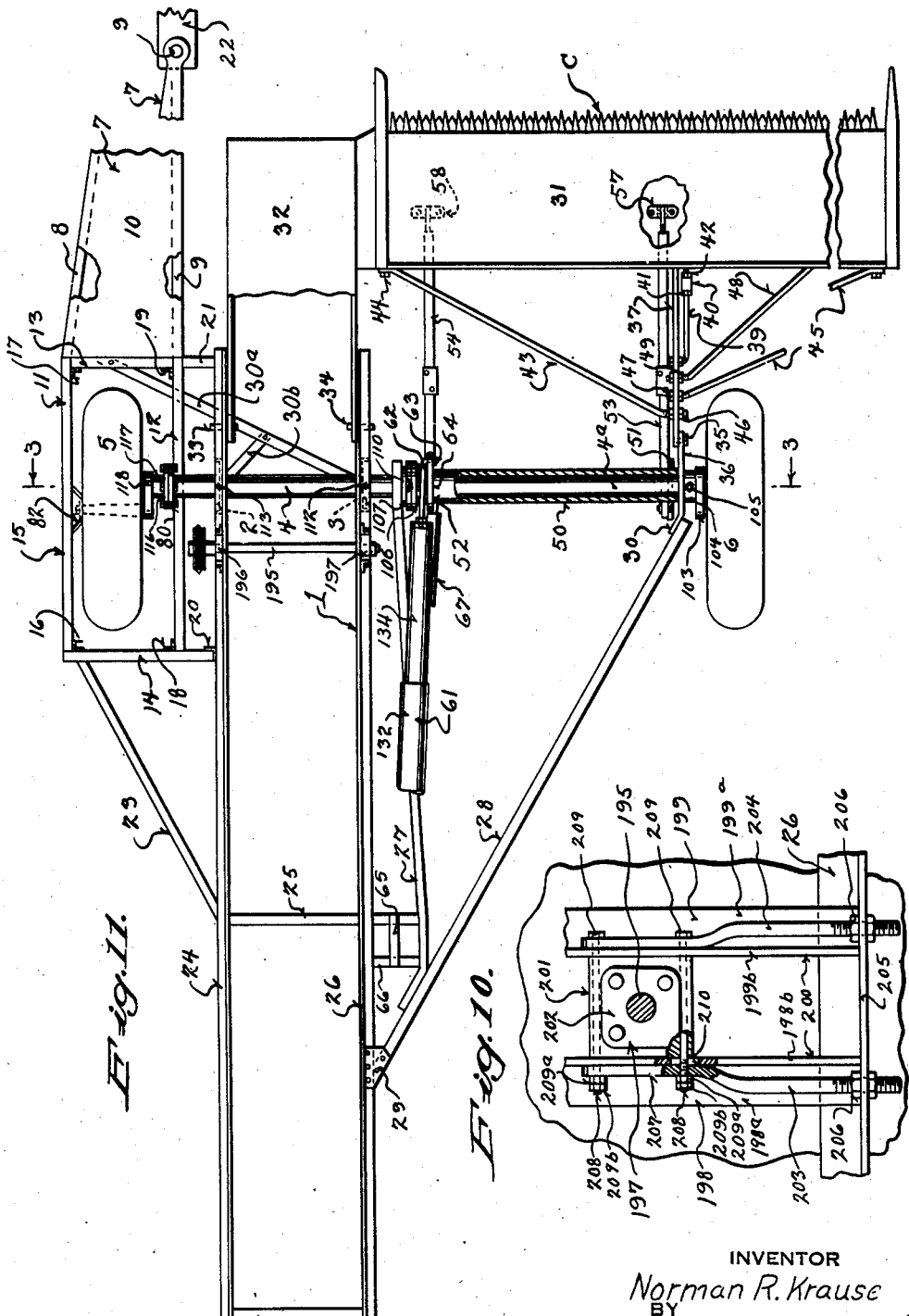

Patented Dec. 7, 1943

2,336,263

UNITED STATES PATENT OFFICE 2,336,263

COMBINATION HARVESTER-THRESHER

Norman R. Krause, Racine, Wis., assignor to J. I. Case Company, Racine, Wis., a corporation Application May 6, 1940, Serial No. 333,489

7 Claims. (Cl. 56—122)

The present invention relates to combination harvester threshers or "combines" and an object thereof is to generally improve the construction and operation of machines of this class. A further object is to improve the general construction and organization of such a machine, and further objects are to provide more rugged, rigid and stable framing for such machines and improved support for the grain bin.

More particularly an object of the invention is to provide for improved support for the harvester portion, improved mechanism for controlling the height of and counterbalancing the harvester portion and distributing in an advantageous manner the stresses due to the overhanging of the harvester ahead of and the thresher in the rear of the axle; to provide for "floating" of the harvester upon encountering an obstruction, adjusting the harvester to counteract any tendency to sag, and stiffening the same against torsional distortion by means exterior to the harvester.

A further object is to provide improved mounting for the cylinder shaft and also for enclosing counterbalancing spring means for purposes of increasing safety. A further object is to provide for resilience or cushioning in the supporting means for the combine.

Further objects and advantages will become apparent from the following specification and accompanying drawings in which Figure 1 is a perspective view taken from above, to the right and slightly to the rear of an illustrative machine with parts removed and others broken away to more clearly show the harvester suspension, counterbalancing and adjusting means.

Figure 2 is a perspective view of the machine taken from ahead, above and to the left, the harvester portion, the enclosing panels and the threshing mechanism being removed for more clearly showing the major frame elements.

Fig. 3 is a detail of the axle, partly in vertical axial section on the line 3—3 of Fig. 11.

Fig. 4 is an end elevation of the same, taken from the left of Fig. 3.

Fig. 5 is an enlarged plan view of certain mechanism indicated in Fig. 1.

Fig. 6 is a side elevation of the same.

Fig. 7 is an enlarged plan view of certain mechanism indicated in Fig. 1.

Fig. 8 is an elevation partly in vertical axial section of harvester counterbalancing and elevating mechanism indicated in Fig. 11.

Fig. 9 is an enlarged detail of a portion of Fig. 8.

Fig. 10 is an elevation of a portion of Fig. 11 with parts broken away showing a cylinder shaft bearing and mounting.

Fig. 11 is a plan view of the framing of the machine with the thresher housing broken away and other parts removed and/or broken away to indicate the general or foundation framing of the machine.

As seen in Fig. 11 the machine comprises a generally rectangular frame 1 connected as by channel members 2 and 3 with a tubular or other suitable axle 4 extending transversely of the frame and carried by a stubble wheel 5 and a grain wheel 6 of any well-known or suitable construction, the details of which form no part of the present invention. A draw bar generally designated as 7 includes converging members 8 and 9 which may conveniently although not necessarily carry a deck 10. Members 8 and 9 may converge and terminate in an eye 9a or other suitable element for connection with a drawing unit. Members 8 and 9 connect in any suitable manner as by welding, riveting, bolting or the like with longitudinal members 11 and 12, a cross member 13 spacing members 11 and 12 and forming therewith a substantially rectangular frame closed by a cross member 14, the frame being generally designated as 15. At the corners of frame 15 column members 16, 17, 18 and 19 respectively, for carrying a grain bin are fixed, as will appear hereinafter. Frame 15 encloses stubble wheel 5 and is connected to frame 1 in suitable manner as by an angle iron 20 at the rear and a member 21 at the front of frame 15.

With the structure so far described, it will be apparent that, with drawbar 7 connected to a tractor drawbar 22 or other stable propelling element, frame 1, due to its connection with frame 15 and draw bar 7 will be transported on axle 4 in a stable manner without the requirement of more than the two wheels, 5 and 6. Frame 15 also has a diagonal strut or brace 23 extending to one of the sills 24 of frame 1 and connected also with a cross member 25 extending to and connected with the other sill 26 of frame 1. Cross member 25 extends past sill 26 and connects with a brace 27 interposed between a strut 28 and axle 4. Strut 28 is connected at one end with sill 26 as by means of gusset plate 29 and at the other end through a plate 30 with a portion 4a of axle 4. Brace 23 and strut 28 being oblique to sills 24 and 26 furnish effective bracing against lateral weaving of the rear overhanging end of frame 1 relatively to axle 4 and draw bar 7. In fact brace 23 and strut 28, together with cross member 25 provide a bracing system adapted for transmitting stresses set up by grain wheel 6 around the back of the machine to the drawbar, without imposing such stresses on the separator housing. A diagonal brace 30a extends from cross member 13 and connects with axle 4 approximately at its point of connection with sill 26 as will more fully appear below, and a diagonal brace 30b extends from approximately the point of connection between sill 24 and axle 4 to an intermediate point on brace 30a.

A harvester portion in the present instance, although not necessarily, in the form of a trough and generally designated as 31, is disposed in advance of axle portion 4a and carried in a manner to be vertically movable relatively to the axle and frame 1. This is accomplished by swinging the entire header structure together with a feeder housing portion 32 about aligned pivots 33 and 34 carried by sills 24 and 26 and a pivot 35 substantially aligned with above mentioned pivots 33 and 34 and supported from axle portion 4a. Conveniently, although not necessarily, an arm 36, being a part of above mentioned plate 30, extends from axle portion 4a to support pivot 35. A rigid member or arm 37 extends forwardly and downwardly from pivot 35 and engages with the lower portion of harvester 31 as at 38, Fig. 8, the arm 37 constituting a rigid rearward extension of harvester portion 31. A brace 39 extends from arm 37 to a fitting 40 fixed to an upper portion of harvester 31, brace 39 being adjustable in length, if desired, as for example by means of lock nuts 41 and 42. By this means the relatively flexible harvester portion may be adjusted to a desired attitude in relation to arm 37. A brace 43, Figs. 1 and 11, extends from arm 37 to a point 44 on the upper part of harvester 31 in the neighborhood of feeder housing 32. A brace 45 extends from arm 37 to the neighborhood of the outer extremity or grain end of harvester 31, brace 45 being also connected near the uppermost portion of harvester 31 as clearly apparent from Fig. 1. Both braces 43 and 45 are adjustable in length relatively to arm 37 as by nuts 46 and 47. In this manner a very rigid and stable connection to pivot 35 and accordingly to axle portion 4a is obtained so that the duty of preventing lateral displacement of harvester 31 under the shaking movement of the combine will not fall entirely upon the feeder housing 32. A brace 48 also extends from arm 37 to the lowermost portion of harvester 31 near or spaced inwardly somewhat from the grain end of the harvester as clearly seen in Fig. 1. Brace 48 is adjustable relatively to arm 37 as by a nut 49, this brace being readily adjusted to compensate for the natural tendency toward sagging of the grain end or outer end of the harvester, it being possible to so adjust brace 48 that no sagging will take place.

It should be noted that, in the case of a trough type of harvester portion there is a certain inherent stiffness due to the semi-tubular configuration of the trough, but, unlike a complete tube, the trough has no particularly strong resistance to torsional distortion. Consequently any sagging of the cutter bar C of harvester portion 31 would have to be accompanied by a twisting of the trough, and conversely twisting of the trough can be utilized for raising or lowering one end of the cutter bar relatively to the other. Such twisting of the trough is easily effected by adjustment of braces 45 and 48, and may be very accurately controlled.

It will now be apparent that harvester 31, feeder housing 32 and arm 37 constitute a substantially rigid unitary assembly which may be swung up and down about pivots 33, 34 and 35. Means is provided for so swinging the harvester assembly and for partially supporting the weight thereof so that it may "float" about the aforementioned pivots if it encounters an obstruction while traveling close to the ground. Satisfactory mechanism for this purpose may include a sleeve or torsional element 50 in the present instance journaled on axle portion 4a, although certain of the purposes of the invention might be realized with the member 50 otherwise located. Sleeve 50 in the present instance is provided with downwardly extending arms 51 and 52 rigidly fixed therewith as for example by welding, and compression links 53 and 54 are pivoted respectively with arms 51 and 52 as for example by pins 55 and 56. Links 53 and 54 extend forwardly from pivots 55 and 56 and are pivoted respectively at 57 and 58 with the lower portion of harvester 31. Rotation of sleeve 50 in a direction tending to move links 53 and 54 forwardly will therefore exert a lifting force on harvester 31 and furthermore the spaced connections or pivots 57 and 58 will tend to transmit any twisting of header 31, as by relative forward or rearward movement of one of links 53 and 54 to sleeve 50, which movement will be strongly resisted by the torsional strength of sleeve 50. Links 53 and 54 are adjustable in length by any suitable means as will later appear, so that the desired relation between sleeve 50 and the spaced points 57 and 58 may be readily obtained for exerting the desired effect on harvester 31 in cooperation with braces 45 and 48. Control of the rotation of sleeve 50 will accordingly effect desired adjustment of harvester 31, and adjustment of elements 53, 54, 43, 45 and 48 will position cutter bar C as desired and relieve feeder housing 32 of the stresses which would otherwise be imposed upon it by the harvester portion.

The weight of harvester 31 is in effect carried on links 53 and 54 and this is partially counterbalanced by a spring unit or other suitable means generally designated as 61, having a pull rod 62 pivotally engaged at 63 with an arm 64 extending upwardly from sleeve 50. The end of unit 61 opposite pull rod 62 is anchored to members 25 and 27 of the combine, the frame being strengthened at this point by sections 65 and 66, Fig. 11, to withstand the very considerable pull of unit 61. The backward pull of pull rod 62 will cause a forward thrust on links 53 and 54 which thrust may be so chosen as to partially balance the backward thrust on these links due to the weight of harvester 31.

Adjusting mechanism generally designated as 67 is engaged with downwardly extending arm 52, Fig. 8, as by pin 56, although within the contemplation of the invention member 67 may be engaged with a separate pin not shown, if desired. Member 67 is arranged to be movable preferably by power and is anchored to member 27 and cross member 25 as will appear. Forward movement of member 67 will accordingly cause forward movement of arms 52 and 51 with corresponding rotation of sleeve 50, thus causing through links 53 and 54 upward movement of harvester 31 about pivots 33, 34 and 35. The thrust necessary in member 67 is reduced in accordance with the pull exerted on rod 62 by counterbalancing member 61 as seen in Fig. 8. Member 67 is slotted as at 67a where it engages pin 56. Normally pin 56 remains solidly in the rear end of the slot, but in the event of the harvester's striking an obstruction the harvester may rise with consequent forward movement of links 53 and 54, counterclockwise movement of sleeve 50, and forward movement of pin 56 in slot 67a. This "floating" of the harvester is assisted by the pull of counterbalancing member 61, which, as above described, exerts a continuous forward thrust on links 53 and 54.

As hereinbefore stated, it is desirable that weaving stresses set up by the very considerable load of the grain bin be isolated so far as possible from thresher housing 1 in order not to distort the same. In the present instance this is accomplished by carrying the grain bin on frame portion 15 as seen in Fig. 2. Column members 16, 17, 18 and 19 extend upwardly to approximately the level of the upper frame members 69 and 70 of the thresher housing where members 16 and 17 are connected by a longitudinal strut 71 and members 18 and 19 are joined by a strut 72, struts 71 and 72 being connected at their forward ends by a brace 73 and the rear ends by a brace 74, thus building up a box-like framework about stubble wheel 5 and including as a part thereof previously mentioned members 11 and 12 directly connected with or forming a part of draw bar 7, it being understood that these braces, struts, etc., are connected at their junction points by any suitable or well-known means forming no part of the present invention. Extending upwardly from strut 71 are members 75 and 76 and similarly extending upwardly from strut 72 are members 77 and 78 engaged with suitable portions of grain bin 79 which may be of any suitable or well-known type forming no part of the present invention.

Member 12 is fixed with axle 4 as by means of a flange 80 and member 11 is connected in the present instance with a stub axle 81 carried by wheel 5, as by means of a bracket or adapter plate 82. Through their connection with columns 16, 17, etc., members 11 and 12 accordingly carry the weight of grain bin 79 substantially directly on wheel 5 without imposing any of said weight on the separator housing. However, there remain side sway and fore and aft oscillation to be counteracted. Fore and aft oscillation is transmitted directly to the draw bar through a brace 83 extended in the present instance from strut 72 diagonally downward to member 9. Side sway of the bin is effectively prevented by a brace 84 extending from members 75 and 77 across the thresher housing and bending downward as at 85 to connect with above-mentioned plate 30 which as above noted is fixed with axle portion 4a adjacent grain wheel 6. Any stresses set up by side sway of grain bin 79 are accordingly transmitted across to the axle and are resisted by brace 84 without tending to distort thresher housing 1. In fact brace 84 is effective enough in this respect that frame members 69 and 70 of housing 1 may be connected if desired with brace member 84 as by straps 86 and 87 bolted or otherwise suitably fixed with brace 84 to assist in preventing any weaving or distortion of the thresher housing due to forces arising within itself.

In order to prevent upward buckling of brace 84 under compressive stresses, a tie rod 88 is extended from approximately point 85 to axle 4 as will further appear and to further brace the structure and prevent distortion of the frame members to the left of the direction of travel, a tie rod 89 is extended from strut 71 diagonally downward to above mentioned channel member 2.

Frame members 69 and 70 bend downwardly at the front of thresher housing 1 and support an engine carrying frame generally designated as 90 comprising a rear member 91, side members 92 and 93, and a front member 94. Member 91 is carried on and fixed to the above mentioned members 69 and 70, while member 90 is supported on columns 95 and 96, in the present instance joined with sills 26 and 24 respectively. Member 94 extends across the front of the machine and is connected with above mentioned column members 17 and 19 whereby to steady the engine carrying frame and prevent lateral weaving thereof.

Above mentioned brace 83 has a strut 97 extending from member 13 and engaging member 83 approximately midway of the length thereof. This helps to steady member 83 and assist it to withstand compressive stresses. To prevent torsional weaving of the box structure, comprising members 16, 17, 18, 19, 71, 72, 73 and 74, etc., diagonal braces 98 and 99 extend from approximately the mid point of member 11 to opposite ends of strut 71, while other diagonal braces 100 and 101 extend from approximately the mid point of strut 72 to the ends of member 12.

This completes the general description of the major characteristic features of the machine as a whole, and attention is accordingly directed to certain units and assemblies constituting sub-combinations of the general structure.

Axle 4 as seen in Fig. 3, comprises a plurality of sections some of which have been already mentioned, namely 4, 4a and stub axle 81. A second stub axle 102 is carried on a web 103 fixed in any suitable manner with a sleeve 104 which is in turn fixed with above mentioned plate 36. In the present instance sleeve 104 has a sliding fit on axle section 4a and is retained thereon as by a bolt 105 passing through sleeve 104 and the extremity of axle 4a. Axle portion 4a may conveniently comprise a substantially straight tubular member having a flange 106 engaged with a flange 107 on axle portion 4 to form a rigid unitary member. Bolts as 108 and 109 secure the flanges solidly together, and one or more of such bolts may engage the plate 110 to which is secured above mentioned brace 27 and tie rod 88 as by a bolt 111. For transportation of the machine substantial distances, or for other reasons which may make it desirable, the machine may be narrowed by removing axle section 4a at flange 107, of course removing other parts connected with section 4a. Plate 30 including web 103 and stub axle 102, are removed from axle section 4a and plate 30 is secured against flange 107, as suggested in dotted lines, which will bring the overall width of the machine down to less than half of what it is in condition for operation.

Sleeve 50, as above described, is journaled on section 4a and arms 51 and 52 are suitably fixed thereto as by welding or other suitable expedients. Arm 52 may be bifurcated to obtain better support for pin 56, element 67 being engaged within the bifurcated portion of arm 52, as shown.

Section 4 has above mentioned channel members 2 and 3 constituting anchor plates welded or otherwise securely fixed thereto and to which above mentioned sills 24 and 26 are secured, as by bolts or the like 112 and 113, together with other elements of the structure not necessary to desscribe as they form no part of the present invention. Section 4 as above described has a flange 80 to which is fixed as by bolts 114 and 115 a flange 116 carryin ; a sleeve 117 which in turn carries a web 118 fixed with above mentioned stub axle 81. Flange 80 is also fixed with above mentioned member 12 as by a bolt 119.

When axle 4 is in position in the machine, it is rigidly held by anchor plates 2 and 3 and other connections against rotation and its position is so chosen that webs 103 and 118 are inclined backwardly as indicated in Fig. 4. A turning moment is accordingly set up in the axle by the upward reaction of wheel 6 on stub axle 102, particularly in section 4a. The latter will tend to yield slightly under the resulting torsional stress and provide a cushioning support for the apparatus. This is particularly important when the machine is carried on metal wheels and it reduces the resulting shock loads throughout the structure appreciably.

Counterbalancing unit 61 is of an enclosed type and comprises essentially an adjusting rod 120 which may be threaded throughout its length and anchored in a bracket generally designated as 120a fixed to above mentioned brace 27 and other structure of the combine as will presently appear. Adjusting rod 120 carries a nut 121 in the present instance fixed with the rod and bearing against bracket 120a and by means of which the rod may be turned for adjusting the counterbalancing unit relatively to the bracket. Also on adjusting rod 120 is a nut 122 engaged against a spider 123 which in turn bears against a head 124 clamped there against as by screws 125—125. Springs as 126—126 are engaged with spider 123 and extend to another spider 127 disposed on pull rod 62, spider 127 being clamped against a head 128 between nuts 129 and 130. To prevent relative rotation of spider 127 and head 128, screws as 131 may be engaged between the spider and head as shown. A tubular housing member 132 extends from above mentioned head 124, fixed therewith in any suitable manner as by screws, rivets, or the like 133—133, and a complementary tubular housing member 134 extends from head 128, being fixed therewith in any suitable manner as by screws or the like 135—135. Housing members 132 and 134 are engaged in freely telescoping relation with each other, and slide easily to accommodate the stretching and retracting of springs 126 with the rocking of arm 64. The powerful springs 126 are protected from the weather and other destructive influences by housing members 134 and 132 and conversely the operator of the machine is protected from flying parts in the event of possible breakage of one of the springs.

Adjusting element 67 in the present instance is of telescoping screw type. A reversing gear generally designated as 136 is mounted on trunnions as 137, Fig. 7, carried in bracket 120a or otherwise journaled on the structure and has a driven shaft 138 which is threaded at 139. Shaft 138 extends within a tubular element 140 and the threaded section is engaged with a nut 141 secured within tube 140 as by screws 142—142. A bushing 143 is secured within tube 140 adjacent nut 141 and a second bushing 144 is secured within tube 140 spaced from nut 141, the spaced bearing of bushings 143 and 144 on shaft 138 giving stability to the connection between the shaft and tube so that a substantially rigid telescoping unit is provided which can develop substantial expansive thrust without buckling. Tube 140 has a fitting 145 secured therein as by an eyebolt 146, fitting 145 providing above mentioned slot 67a.

A tubular housing element 147 extends from reverser 136 and encloses a portion of tube 140 to enclose shaft 138 and exclude dirt from reverser 136 and bushing 144. It will now be apparent that rotation of shaft 138 in one direction will cause expansion of member 67 and counterclockwise rocking of sleeve 50, assisted by the contractile force of springs 126—126, while rotation of shaft 138 in the opposite direction will cause contraction of element 67 and opposite rotation of sleeve 50 with corresponding expansion of springs 126—126. Suitable mechanism generally designated as 148 is provided for automatically limiting the movement of element 67, the operation of which will be clear from the following description.

As seen in Fig. 9, reverser 136 is enclosed in a housing 149 through which extends above mentioned shaft 138. Shaft 138 is journaled in bearing portions 150 and 151 and has journaled thereon within housing 149 bevel gears 152 and 153, driven in opposite directions from a bevel gear 154 fixed with a shaft 155 (Fig. 7) journaled in a trunnion or bearing portion 156 also carried by housing 149. Gears 152 and 153 are provided with clutch jaws 157 and 158 respectively, and a clutch element 159 slidably keyed to shaft 138 between gears 152 and 153 has clutch jaws 160 and 161 engageable alternatively with jaws 157 and 158, whereupon shaft 138 may be driven in either direction as required for extending or retracting member 67 as above described. Clutch 159 has a groove or similar means 162 engaged by a shipper 163 fixed as by means of a pin 164 with a rod 165 slidable in casing 149. Sliding of the rod will shift clutch element 159 into engagement with either gear, depending upon the direction of movement of the rod. Detent means of suitable type generally designated as 165a may be provided for maintaining rod 165 and clutch 159 in desired positions.

Appreciable thrust may be developed in shaft 138 and to accommodate this a thrust bearing or plate 166 is keyed or otherwise secured on shaft 38 in the present instance within a recess 167 in housing 149. Plate 166 is maintained within recess 167 as by cover plate 168 bolted or otherwise securely fixed in place over the recess. Plate 166 rotates when in operation in contact with either housing 149 or cover plate 168 according as the thrust is in the direction to the right or left as seen in Fig. 9. Plate 166 may for convenience be retained on shaft 138 as between a shoulder 169 and a nut 170, cover plate 168 having a shielding portion 171 enclosing nut 170. Shaft 138 continues beyond nut 170 and has a nut or other polygonal or non-circular portion 172 for engagement of a wrench or the like by which shaft 138 may be rotated at such times as power is not available on the combine.

The upper portion of housing 149 is closed by a cover plate 173 suitably held in place by well-known means and having a filler neck 174 closed by a cap or the like 175. Through neck 174 a quantity of lubricant may be introduced into housing 149 for "oil bath" operation of the mechanism within the housing. Shaft 155, Fig. 7, may carry sprocket 176 or other driving means actuated from any convenient power source on the combine, forming no part of the present invention. Such power sources, such as adjacent rotating sprockets, pulleys, shafts and the like, being well-known on combines generally, it is considered unnecessary to describe them further.

As seen in Figs. 5 and 6, bracket 120a includes side sections 177 and 178 engaged at their mid portions respectively with frame elements 65 and 27 and having upward extensions 179 as seen more particularly in Fig. 6, connected by a member 180 bridging the space between members 177 and 178 and forming the anchoring means for above mentioned nut 121. Members 177 and 178 are securely anchored to members 65 and 27 as by bolts 181—181.

Members 177 and 178 also have downwardly extending portions as 182 in which are journaled above mentioned trunnion 137 and bearing or trunnion 156. In this manner, reverser 136 is pivotally supported so that it may remain in line with shaft 138 in spite of the arcuate movement of pin 56. Reverser 136 may be controlled from a control rod 183 which may be extended to a convenient point for actuation by the operator, rod 183 being suitably pivoted to a lever 184 fixed with a shaft 185 journaled in bearings as 186 carried for example on brace 27 and other appropriate parts of the machine. Shaft 185 carries a lever 187 to which is pivoted a link 188, pivotally connected as by a pin 189 with above mentioned rod 165. Fore and aft movement of rod 183 will accordingly cause, through shaft 185, levers 184 and 187 and link 188, shifting of clutch 159 to raise or lower harvester portion 31 as above described without other exertion on the part of the operator.

Limit control mechanism 148 comprises a shifter rod 190 pivotally connected to eyebolt 146 or otherwise suitably connected for reciprocation with portion 145. Rod 190 extends slidably through a sleeve 191 fixed in any suitable manner, as by welding, with or comprising part of a link 192 pivotally engaged with lever 187. Collars or other suitable stop means 193 and 194 are fixed on rod 190 and so located as to shift sleeve 191 and link 192 so as to return lever 187 to the neutral position shown. If operation of shaft 138 continues, to the point of engagement of either collar with sleeve 191, clutch 159 will be shifted by movement of link 192, lever 187 and link 188, and the lead of screw 138 and the direction of rotation of shaft 155 are so chosen that the resulting movement of clutch 159 will be away from the gear with which it is engaged.

For example, with the structure shown, if a "right hand" thread were used on screw shaft 138, counter-clockwise rotation would be required in gear 154, as seen in Figs. 8 and 9, whereas, if clockwise rotation only is available for gear 154, a "left hand" thread will be necessary on screw shaft 138.

Another major element requiring to be substantially supported is the cylinder and accordingly the means for mounting the cylinder shaft is included as part of the general framing of the combine. As seen in Fig. 11, the cylinder shaft 195 is carried in bearings generally designated as 196 and 197, the details of the cylinder forming no part of the present invention, the shaft only being disclosed. The bearings 196 and 197 and their mountings being substantially identical, bearing 197 only will be described.

As seen in Fig. 10, braces 198 and 199, conveniently comprising angle irons are suitably fixed as by welding, riveting, or the like, with sill 26 of body portion 1, and extend upwardly along the wall thereof, one flange 198a of brace 198 being disposed flat against said wall and the other flange 198b extending outwardly. Brace 199 is similarly constituted, a flange 199a being disposed against body portion 1 and a flange 199b extending outwardly so that a channel 200 is formed between the braces 198 and 199. A block 201 is placed in channel 200 and carries a bearing unit generally designated as 202 which may be of any suitable type, forming no part of the present invention. Jack bolts 203 and 204 extend through the outwardly disposed flange 205 of sill 26, and may be locked therein as by nuts 206—206. The bolts may be flattened if desired as at 207 and other bolts 208—208 extend through the flattened portions and through outwardly directed flanges 198b and 199b and through block 201, bolts 208 including heads 209—209, and being arranged for clamping jack bolts 203 and 204, flanges 198b and 199b and block 201 rigidly together as by means of nuts 209a—209a, which in turn may be secured as by lock nuts 209b—209b. In this manner, block 201 and bearing 202 are carried in an extremely stable and substantially rigid manner directly from sill 26.

It is desirable to locate cylinder shaft 195 quite accurately with relation to internal parts of the threshing mechanism, not shown and forming no part of the present invention. Slots as 210 are therefore formed in flanges 198b and 199b for the accommodation of bolts 208—208, whereas said bolts are relatively closely fitted in jack bolts 203 and 204 and block 201. By proper manipulation of nuts 206—206, while clamping nuts 209a and 209b are loosened, block 201 may accordingly be very accurately raised or lowered in channel 200 to obtain the desired adjustment of shaft 195. When such adjustment is secured, nuts 206—206 and 209a and 209b may be tightened, whereupon flanges 198b and 199b and bolts 203 and 204 will be rigidly clamped together, and the block and bearing very strongly supported by braces 198 and 199 and bolts 203 and 204. To facilitate this adjustment it is desirable, although not imperative, that bearing units as 202 be of a type permitting substantial misalignment, many of which are well known.

The operation of the various phases of the invention is thought to be clear from the foregoing description, it being noted that the framework, particularly as disclosed in Figs. 1 and 2, is so constituted as to carry the load of the machine parts on the wheeled axle without imposing undue stresses on the main body portion 1 of the threshing mechanism, so that distortion of the same and misalignment of the working parts, for example by swaying of the heavily loaded grain bin, is avoided. It will also be apparent that the harvester portion is securely supported and carried directly from the axle in such a manner that no undue stresses are produced in the feeder spout. The harvester is supported from below by means which assist in stiffening it and in preventing distortion or sagging. The means for so supporting the harvester constitutes a truss below the axle which tends to resolve the weight of the harvester, movably supported at the front of the machine, into an upward thrust at the rear of the machine to put the whole organization substantially in balance. This means also allows the harvester portion to "float" over any obstruction inadvertently encountered without damage to the harvester or its supporting mechanism, and also provides a power actuated lifting or adjusting means for adjusting the harvester to the desired height above the ground without other effort on the part of the operator than shifting the control rod 183. It also provides counterbalancing means for relieving the elevating means of part of the work of lifting the harvester. The spring means for counterbalancing the harvester is enclosed for purposes of safety.

It will also be apparent that the cylinder shaft is supported in a very secure manner, but that it may be readily adjusted in position by manipulating nuts 206, 209a and 209b. The axle for supporting the combine is so disposed that it may yield torsionally to cushion the shocks transmitted to the structure by its passage over the ground, and the axle may be readily shortened substantially for narrowing the machine for transportation on the highway.

The above being a complete description of an illustrative embodiment of the invention, what is claimed as new and desired to be secured by Letters Patent of the United States, is:

1. In a combination harvester thresher having an axle, a thresher housing carried on the axle, a draw bar and bin carrying frame connected with the axle at one end thereof, diagonal bracing means extending from the opposite end of said axle rearwardly to said thresher housing, diagonal bracing means extending rearwardly from said drawbar and bin carrying frame rearwardly to said thresher housing, and bracing means connecting said rearwardly extending diagonal bracing means in the region of their connection to said thresher housing for bracing the end of said axle remote from said drawbar and bin carrying frame against rearward ground reactions without imposing such reactions directly upon said thresher housing.

2. In a combination harvester thresher having an axle, a thresher housing carried on the axle, a drawbar and bin carrying frame connected with the axle at one end thereof, diagonal bracing means extending from the opposite end of said axle rearwardly to said thresher housing, and connections from said diagonal bracing means past said thresher housing and diagonally forward to said drawbar and bin carrying frame.

3. In a harvesting machine, a ground engaging element, an upwardly extending bin carrying frame carried by the ground engaging element, a grain bin on the frame, a drawbar connected with the frame at the lower portion thereof, and a brace extending from the upper portion of said frame forwardly and downwardly and engaged with the drawbar for strengthening the frame against fore and aft oscillation under the weight of grain in said bin.

4. In a harvesting machine, the combination of an axle, a grain bin carrying frame supported at one end of the axle, a grain bin on the bin carrying frame and opposed diagonal braces extending from the bin carrying frame to spaced points on the axle, one of said braces being in compression and the other in tension for steadying the bin carrying frame and preventing swaying thereof relatively to the axle under the load of grain in said bin.

5. In a harvesting machine, the combination of an axle, a grain bin carrying frame supported at one end of the axle, a thresher housing carried on the axle intermediate the bin carrying frame and the opposite end of the axle, a bin carried on the bin carrying frame and means for steadying the bin carrying frame against swaying in the direction of said axle under the load of grain in said bin, including opposed braces for the bin carrying frame, one of said braces extending from said frame past said thresher housing to said axle and the other brace extending diagonally from said frame to said axle on the same side of said thresher housing as said bin carrying frame.

6. In a harvesting machine, the combination of an axle, a grain bin carrying frame supported at one end of the axle, a thresher housing carried on the axle intermediate the bin carrying frame and the opposite end of the axle, a bin carried on the bin carrying frame and a brace for steadying the bin carrying frame against swaying in the direction of said axle under the load of grain in said bin, said brace extending past said thresher housing and being connected with said axle at a point spaced from said thresher housing.

7. In a combination harvester thresher having an axle, a thresher housing carried on the axle, a draw bar and bin carrying frame connected with the axle at one end thereof, diagonal bracing means extending from the opposite end of said axle rearwardly to a point on said thresher frame, diagonal bracing means extending from said drawbar and bin carrying frame rearwardly to said thresher housing, and the first and second mentioned diagonal bracing means being connected in the region of said thresher housing for bracing the end of said axle remote from said drawbar and bin carrying frame against rearward ground reactions without imposing such reactions directly upon said thresher housing.

NORMAN R. KRAUSE.